United States Patent
Yoo et al.

(10) Patent No.: US 8,463,069 B2
(45) Date of Patent: Jun. 11, 2013

(54) APPARATUS AND METHOD FOR PROCESSING IMAGE

(75) Inventors: Young-jin Yoo, Hwaseong-si (KR); Won-hee Choe, Gyeongju-si (KR); Jae-hyun Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 906 days.

(21) Appl. No.: 12/573,976

(22) Filed: Oct. 6, 2009

(65) Prior Publication Data

US 2010/0124373 A1  May 20, 2010

(30) Foreign Application Priority Data

Nov. 17, 2008 (KR) .................. 10-2008-0113984

(51) Int. Cl.
*G06K 9/40* (2006.01)

(52) U.S. Cl.
USPC ........................................................ 382/274

(58) Field of Classification Search
USPC ............. 345/241, 470, 533, 606, 607, 618, 345/622, 683, 701, E7.052, E5.083, 908, 345/909; 382/263, 264, 274
See application file for complete search history.

(56) References Cited

U.S. PATENT DOCUMENTS

| 7,265,785 | B2 | 9/2007 | Hamasaki |
| 7,755,016 | B2 * | 7/2010 | Toda et al. .................. 250/208.1 |
| 2006/0132642 | A1 * | 6/2006 | Hosaka et al. ................ 348/370 |
| 2007/0047832 | A1 | 3/2007 | Nonaka et al. |
| 2008/0303920 | A1 | 12/2008 | Kinoshita |

FOREIGN PATENT DOCUMENTS

| JP | 2004-064192 | | 2/2004 |
| JP | 2006-115147 | | 4/2006 |
| KR | 10-2006-0071893 | | 6/2006 |
| KR | 1020060071893 | * | 6/2006 |
| KR | 1020060071893 A | * | 6/2006 |
| KR | 10-2007-0024333 | | 3/2007 |
| KR | 10-2007-0024559 | | 3/2007 |

* cited by examiner

*Primary Examiner* — Gregory F Cunningham
(74) *Attorney, Agent, or Firm* — NSIP Law

(57) ABSTRACT

An image processing apparatus and method are provided. In an exemplary method, noise of a main image signal is removed or reduced, using information about a subsidiary image signal with sensitivity higher than the main image signal or information about the main image signal, and details of the main image signal are restored using high-frequency components of the subsidiary image signal.

26 Claims, 8 Drawing Sheets

APPARATUS AND METHOD FOR PROCESSING IMAGE

CROSS-REFERENCE TO RELATED APPLICATION(S)

This application claims the benefit under 35 U.S.C. §119(a) of a Korean Patent Application No. 10-2008-0113984, filed Nov. 17, 2008, the disclosure of which is incorporated herein in its entirety by reference for all purposes.

BACKGROUND

1. Field

The following description relates to a technology to process an image, and more particularly, to reduce noise and restore details of an image.

2. Description of Related Art

In general, an image acquiring apparatus acquires and processes light reflected from an object to display an image of the object to a user. Recent developments in information communication technology have led to the distribution of various image acquiring apparatuses such as digital cameras.

Generally, a digital camera includes an image sensor to absorb light reflected from an object and to convert the light into an electrical signal. The digital camera processes the image signal acquired from the image sensor to display an image. When absorbing light, typically, the digital camera selectively absorbs a specific wavelength of visible light through a filter disposed in front of the image sensor.

In a low illumination environment, for example, indoor or at nighttime, or in high-speed photography, however, upon capturing using a specific wavelength of visible light, image distortion may occur due to noise. For example, in the case of a color image, high-frequency/detail components may be distorted due to low sensitivity and noise, resulting in noticeable picture-quality deterioration.

Meanwhile, an image acquiring apparatus absorbing a wavelength of infrared light has been developed. An example of such apparatus is an infrared camera, and typically, an image acquired from the infrared camera has no color information but has relatively high sensitivity.

SUMMARY

According to one general aspect, there is provided an image processing apparatus including one of one or more modules and one or more devices, or including a combination thereof, configured to receive a main image signal and a subsidiary image signal, remove or reduce noise of the main image signal using information about the subsidiary image signal, and restore details of the main image signal using high-frequency components of the subsidiary image signal.

The main image signal may be a color signal or an RGB signal, and the subsidiary image signal may be a signal composed of all wavelengths of visible light, a signal composed of all wavelengths of visible light and wavelengths of infrared light, or a signal composed of all wavelengths of visible light and wavelengths of ultra-violet light.

The information about the subsidiary image signal may be information about a noise characteristic of the subsidiary image signal.

The image processing apparatus may be one of a software system and an image processing chip, or a combination thereof, the one or modules may be one or more software modules of the software system, and the one or more devices may be one or more hardware devices of the image processing chip.

According to another general aspect, there is provided an image processing apparatus including a first noise reduction unit configured to remove or reduce noise of a subsidiary image signal, a second noise reduction unit configured to remove or reduce noise of a main image signal using information about the subsidiary image signal, a high-frequency extractor configured to extract high-frequency components of the subsidiary image signal from which the noise has been removed or reduced, and a detail restoring unit configured to restore details of the main image signal using the high-frequency components.

The main image signal may be a color signal or an RGB signal, and the subsidiary image signal may be a signal composed of all wavelengths of visible light, a signal composed of all wavelengths of visible light and wavelengths of infrared light, and a signal composed of all wavelengths of visible light and wavelengths of ultra-violet light.

The first noise reduction unit may include a profile which reflects a noise characteristic of the subsidiary image signal.

The information about the subsidiary image signal may be information about a noise characteristic of the subsidiary image signal.

The restoring unit may restore the details of the main image signal by composing the main image signal from which the noise has been removed or reduced, with the high-frequency components.

The image processing apparatus may further include a detail extractor configured to receive an output signal of the high-frequency extractor and an output signal of the second noise reduction unit, extract details from the high-frequency components, and apply the details to the detail restoring unit.

The detail extractor may distinguish the details from noise in the high-frequency components based on brightness.

The image processing apparatus may further include a ring distortion reducing unit configured to remove or reduce ring distortion from an output signal of the detail restoring unit.

According to yet another general aspect, there is provided an image processing apparatus including a first noise reduction unit configured to remove or reduce noise of a subsidiary image signal, a second noise reduction unit configured to remove or reduce noise of a main image signal, using information about the subsidiary image signal or information about the main image signal, a high-frequency extractor configured to extract high-frequency components of the subsidiary image signal from which the noise has been removed or reduced, and a detail restoring unit configured to restore details of the main image signal using the high-frequency components.

The main image signal may be a color signal or an RGB signal, and the subsidiary image signal may be a signal composed of all wavelengths of visible light, a signal composed of all wavelengths of visible light and wavelengths of infrared light, or a signal composed of all wavelengths of visible light and wavelengths of ultra-violet light.

The image processing apparatus may further include a switch unit configured to compare an image characteristic of the main image signal with an image characteristic of the subsidiary image signal, and apply the information about the subsidiary image signal to the second noise reduction unit or blocking the information about the subsidiary image signal from being applied to the second noise reduction unit based on the comparison.

The first noise reduction unit may include a profile which reflects a noise characteristic of the subsidiary image signal.

The information about the subsidiary image signal may be information about a noise characteristic of the subsidiary image signal.

The image processing apparatus may further include a detail extractor configured to receive an output signal of the high-frequency extractor and an output signal of the second noise reduction unit, extract details from the high-frequency components, and apply the details to the detail restoring unit.

The detail extractor may distinguish the details from noise in the high-frequency components based on brightness.

The image processing apparatus may further include a ring distortion reducing unit configured to remove or reduce ring distortion from an output signal of the detail restoring unit.

According to still another general aspect, there is provided an image processing method for use in an image processing apparatus, the method including acquiring a main image signal and a subsidiary image signal with sensitivity relatively higher than that of the main image signal, removing or reducing noise of the subsidiary image signal, removing or reducing noise of the main image signal, using information about the subsidiary image signal or information about the main image signal, extracting high-frequency components from the subsidiary image signal from which the noise is removed or reduced, and restoring details of the main image signal from which the noise has been removed or reduced, using the high-frequency components.

The main image signal may be a color signal or an RGB signal, and the subsidiary image signal may be a signal composed of all wavelengths of visible light, a signal composed of all wavelengths of visible light and wavelengths of infrared light, or a signal composed of all wavelengths of visible light and wavelengths of ultra-violet light.

The removing or reducing the noise of the main image signal may include removing or reducing the noise of the main image signal, using the information about the subsidiary image signal or the information about the main image signal based on a comparison of an image characteristic of the main image signal with an image characteristic of the subsidiary image signal.

The image processing method may further include extracting details from the high-frequency components by distinguishing the details from noise in the high-frequency components.

The image processing method may further include removing or reducing ring distortion from a signal resulting from the restoring of the details of the main image signal from which the noise has been removed or reduced.

Other features and aspects will be apparent from the following detailed description, the drawings, and the claims.

Figure 1:
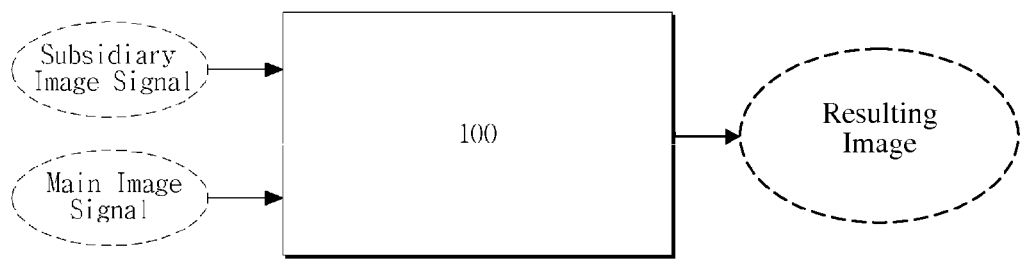
FIG. 1 is a diagram illustrating a configuration of an exemplary image processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 shows a configuration of an exemplary image processing apparatus 100.

Referring to FIG. 1, the image processing apparatus 100 may be a software system or an image processing chip that may be installed in an image acquiring apparatus, such as a digital camera, a set-top box, and the like.

The image processing apparatus 100 receives a main image signal and a subsidiary image signal, processes the signals, and outputs the resulting image. At this time, the processing may include a process of removing or reducing noise of the signals and restoring details so as to obtain a high-sensitivity image.

The main image signal may include color information. For example, the main image signal may be an RGB signal or a color signal corresponding to specific wavelengths in a light spectrum. The subsidiary image signal may have no color information and have sensitivity that is relatively higher than that of the main image signal. For example, the subsidiary image signal may be a white signal (W) composed of all wavelengths of visible light, a white and near infrared signal (W+NIR) composed of all wavelengths of visible light and wavelengths of near infrared light, or a white and ultraviolet signal composed of all wavelengths of visible light and wavelengths of ultra-violet light in the light spectrum.

Figure 2A:
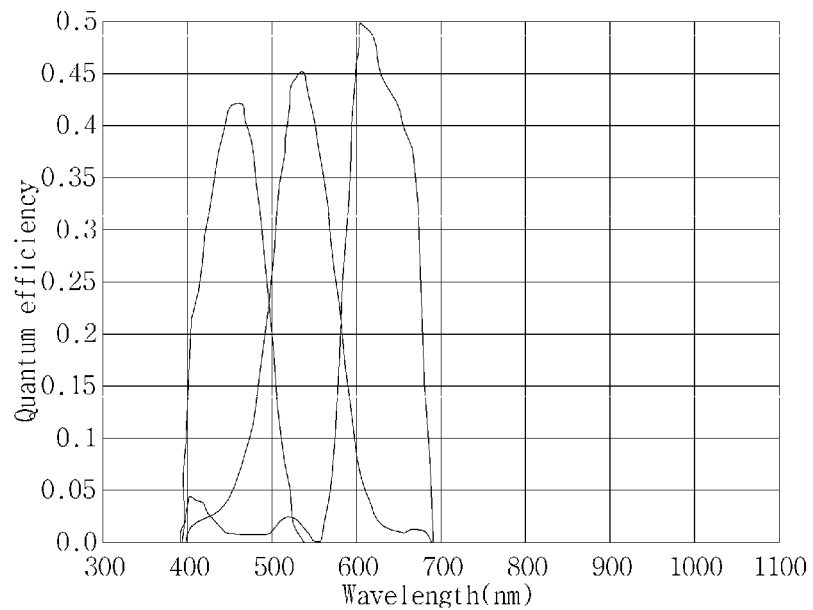
FIGS. 2A and 2B are graphs illustrating spectrums of a main image signal and a subsidiary image signal.
Figure 2B:
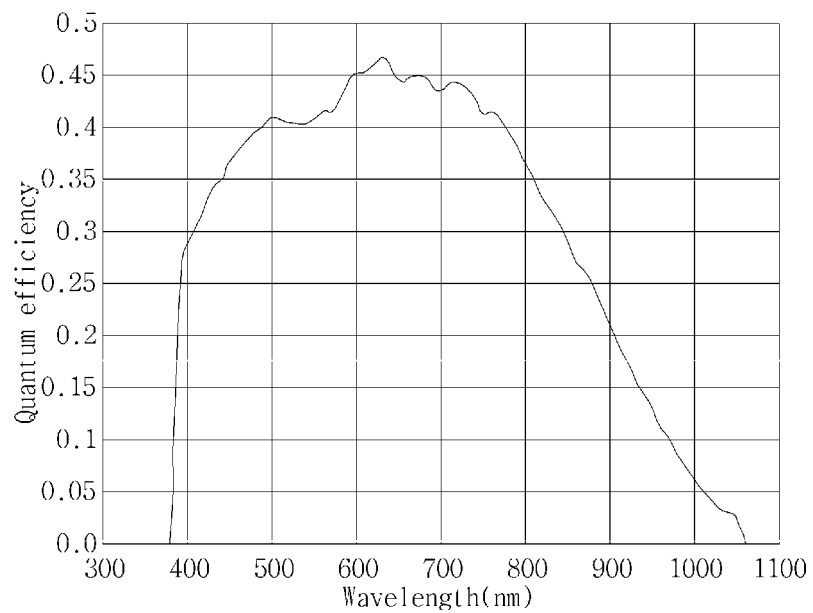

FIGS. 2A and 2B show spectrums of a main image signal and a subsidiary image signal. In particular, FIG. 2A shows the spectrum corresponding to an RGB signal, that is, the main image signal, and FIG. 2B shows the spectrum corresponding to visible light and near infrared light, that is, the subsidiary image signal.

Referring to FIGS. 2A and 2B, the subsidiary image signal has a wavelength range that is wider than that of the main image signal. In general, a color image obtained in a low illumination environment may have significant noise due to an insufficient exposure time, signal amplification, and so on. However, an image signal having infrared light can form a relatively high-sensitivity image as the image signal is generated from light having a wavelength range wider than visible light. That is, referring to FIGS. 2A and 2B, if advantages of the main image signal and the subsidiary image signal having different characteristics are combined, a high-sensitivity image can be obtained.

Figure 3:
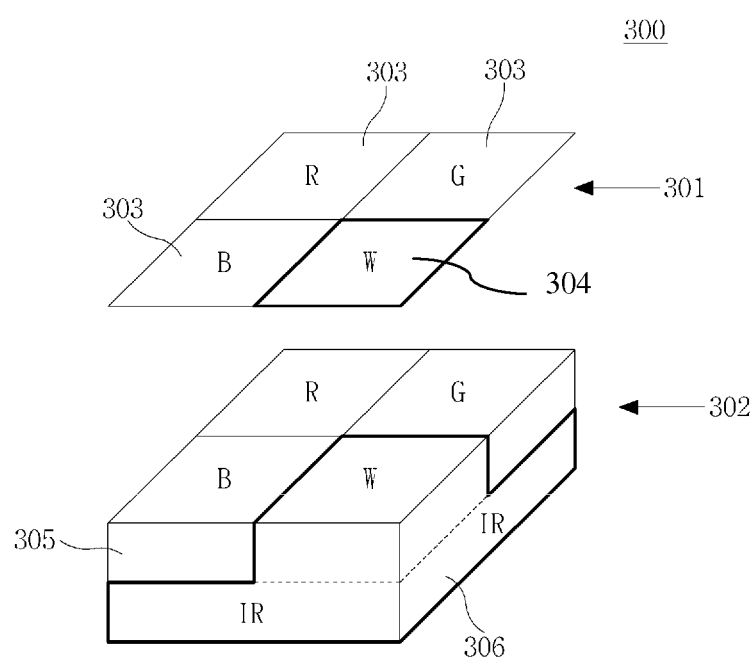
FIG. 3 is a diagram illustrating a structure of an exemplary image sensor.

FIG. 3 shows a structure of an exemplary image sensor 300 to acquire a main image signal and a subsidiary image signal.

Referring to FIG. 3, the image sensor 300 includes a filter unit 301 and a sensor unit 302. The filter unit 301 includes a color part 303 and a transparent part 304. The sensor unit 302 includes a first light-receiving part 305 formed below the color part 303 and a second light-receiving part 306 formed below the transparent part 304. A part of the second light-receiving part 306 may be formed below the first light-receiving part 305.

The color part 303 may transmit only light belonging to a specific wavelength range having color information among visible light, so as to generate the main image signal, for example, an RGB signal using the red (R)—green (G)—blue (B) color part 303. The transparent part 304 may transmit all wavelengths of light, so that an upper portion of the second light-receiving part 306 can sense light, for example, a white signal composed of all wavelengths of visible light, and a lower portion of the second light-receiving part 306 can sense infrared light, for example, an NIR signal having a wavelength longer than that of visible light.

Accordingly, the main image signal can be acquired by the first light-receiving part 305 and the subsidiary image signal can be acquired by the second light-receiving part 306.

Figure 4:
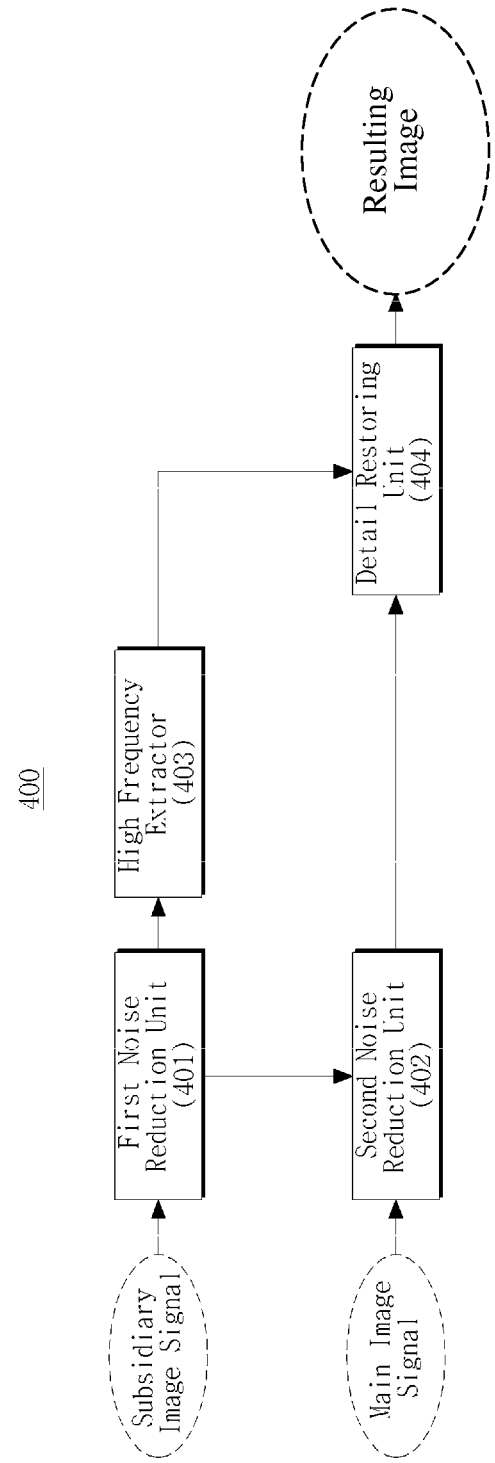
FIG. 4 is a block diagram illustrating an exemplary image processing apparatus.

FIG. 4 shows an exemplary image processing apparatus 400.

Referring to FIG. 4, the image processing apparatus 400 includes a first noise reduction unit 401, a second noise reduction unit 402, a high-frequency extractor 403, and a detail restoring unit 404.

The first noise reduction unit 401 receives a subsidiary image signal, and removes or reduces noise of the subsidiary image signal.

For example, the subsidiary image signal may be a signal (W) with relatively high sensitivity composed of all bandwidths of visible light, a signal (W+NIR) composed of all wavelengths of visible light and wavelengths of near infrared light, or a signal (W+UV) composed of all wavelengths of visible light and wavelengths of ultra-violet light.

Various methods can be used to remove or reduce the noise of the subsidiary image signal. For example, since the subsidiary image signal has relatively high sensitivity, a low-pass pass filter may be used to remove or reduce the noise of the subsidiary image signal.

The first noise reduction unit 401 may include a profile which reflects noise characteristics of the subsidiary image signal. A noise profile can be obtained through an experiment by noise modeling. By using the first noise reduction unit 401 having such a noise profile, errors in estimating noise of the subsidiary image signal may be reduced, thereby enhancing performance, and time taken to estimate the noise of the subsidiary image signal may be reduced.

The second noise reduction unit 402 receives a main image signal, and removes or reduces noise of the main image signal using information about the subsidiary image signal.

For example, the main image signal may be a color signal or an RGB signal with relatively low sensitivity. Also, the information about the subsidiary image signal may be information about noise characteristics of the subsidiary image signal.

Hereinafter, a method of removing or reducing noise of the main image signal using the information about the subsidiary image signal will be described with reference to Equations 1 to 3 below.

$$y = x_1 + n \quad \text{(Equation 1)}$$

In Equation 1, y represents a main image signal, n represents noise information, and $x_1$ represents information about an image from which noise has been removed or reduced. That is, removing or reducing noise from the main image signal y is to obtain $x_1$ in Equation 1. For simplicity of calculation, Equation 1 may be subjected to wavelet transform and the result is as follows.

$$Y = X_1 + n \quad \text{(Equation 2)}$$

A Minimum Mean Square Error (MMSE) estimation scheme may be applied on Equation 2 to obtain $X_1$, and $X_1$ may be expressed by Equation 3 below.

$$X_1 = \{\sigma^2_s / (\sigma^2_s + \sigma^2_n)\} \cdot Y \quad \text{(Equation 3)}$$

In Equation 3, $\sigma^2_s$ represents variance of the signal and $\sigma^2$ represents variance of the noise. The $\sigma^2_s$ value is estimated using noise characteristics of a subsidiary image signal received by the first noise reduction unit 401. In this exemplary way, the noise of the main image signal can be removed or reduced using the information about the subsidiary image signal.

Equations 1, 2 and 3 are used as an illustration to explain the exemplary method of removing or reducing noise of the main image signal using the information about the subsidiary image signal. In addition to the above-described scheme, as another example, a bilateral filter scheme using noise characteristics of the subsidiary image signal calculated by the first noise reduction unit 401 may be used to remove or reduce the noise of the main image signal.

The high-frequency extractor 403 extracts high-frequency components of the subsidiary image signal from the output of the first noise reduction unit 401. For example, the high-frequency extractor 403 extracts the high-frequency components of the subsidiary image signal by performing high-pass filtering on the subsidiary image signal from which noise has been removed or reduced.

The detail restoring unit 404 receives the output of the second noise reduction unit 402, and restores details of the main image signal using the high-frequency components of the subsidiary image signal. For example, by composing the main image signal from which noise has been removed or reduced, which is the output of the second noise reduction unit 402, with the high-frequency components of the subsidiary image signal extracted by the high-frequency extractor 403, details of the main image signal may be restored. The detail restoring unit 404 may have a function of suppressing amplification of noise.

Figure 5:
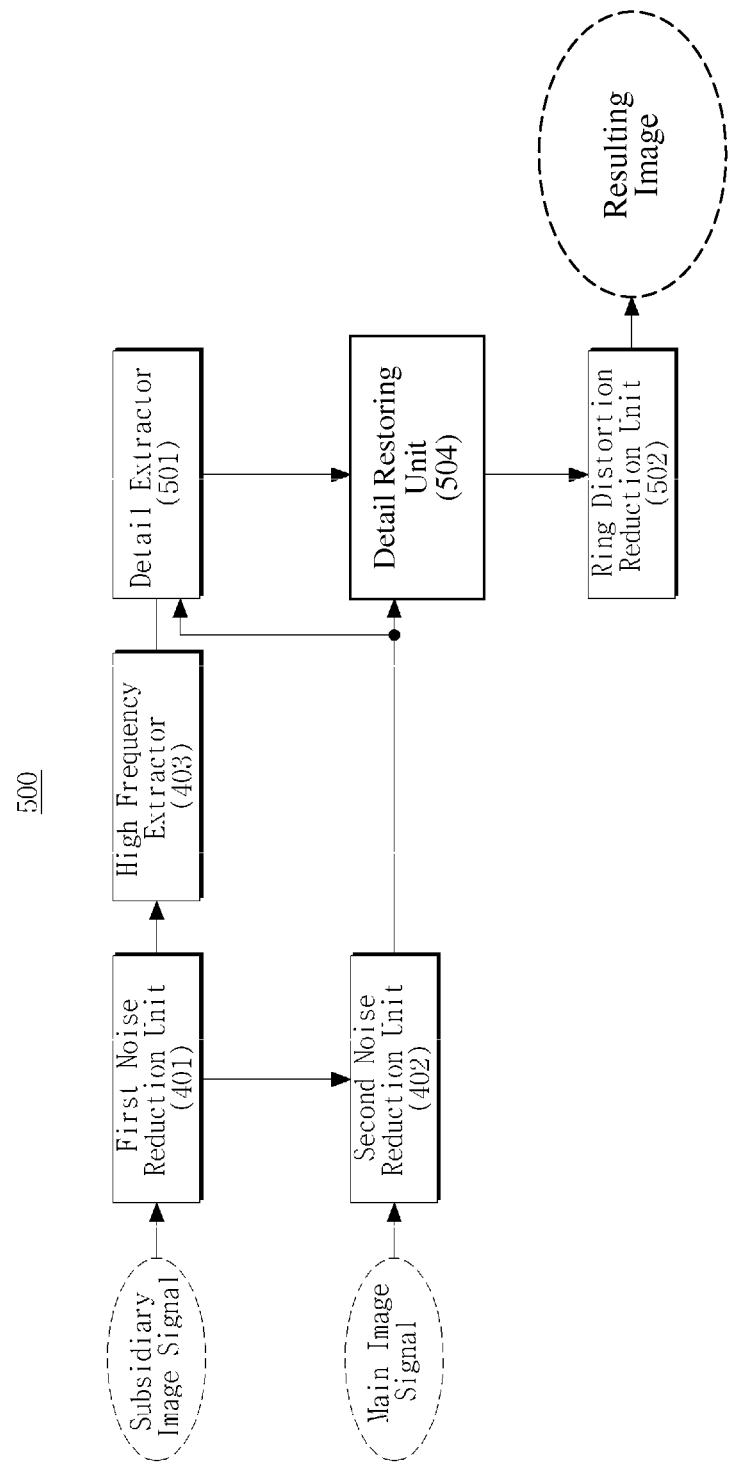
FIG. 5 is a block diagram illustrating another exemplary image processing apparatus.

FIG. 5 shows another exemplary image processing apparatus 500.

Referring to FIG. 5, in addition to a first noise reduction unit 401, a second noise reduction unit 402, and a high-frequency extractor 403, the image processing apparatus 500 includes a detail extractor 501, a ring distortion reducing unit 502, and a detail restoring unit 504. The first noise reduction unit 401, the second noise reduction unit 402, and the high-frequency extractor 403 illustrated in FIG. 5 are substantially the same as the corresponding components illustrated in FIG. 4, and accordingly, further descriptions thereof will be omitted for conciseness.

The detail extractor 501 receives the outputs of the high-frequency extractor 403 and the second noise reduction unit 402, distinguishes details from noise in high-frequency components of a subsidiary image signal to extract the details, and outputs the details to the detail restoring unit 504. In the case of restoring details of a main image signal using high-frequency components of a subsidiary image signal, since there exists a possibility of amplification of noise upon signal composition, the detail extractor 501 is used to distinguish details from noise in the high-frequency components of the subsidiary image signal and apply only the details components to the detail restoring unit 504. For example, the distinction of details and noise may be based on brightness. The detail restoring unit 504 receives the outputs of the second noise reduction unit 402 and the detail extractor 501, and restores the details of the main image signal.

The ring distorting reducing unit 502 receives the output signal of the detail restoring unit 504 and removes or reduces ring distortion of the output signal. For example, the ring distortion reducing unit 502 removes or reduces the ring distortion using Maximum Likelihood Estimation (MLE) through dual clustering on the main image signal and subsidiary image signal from which noise has been removed or reduced.

Figure 6:
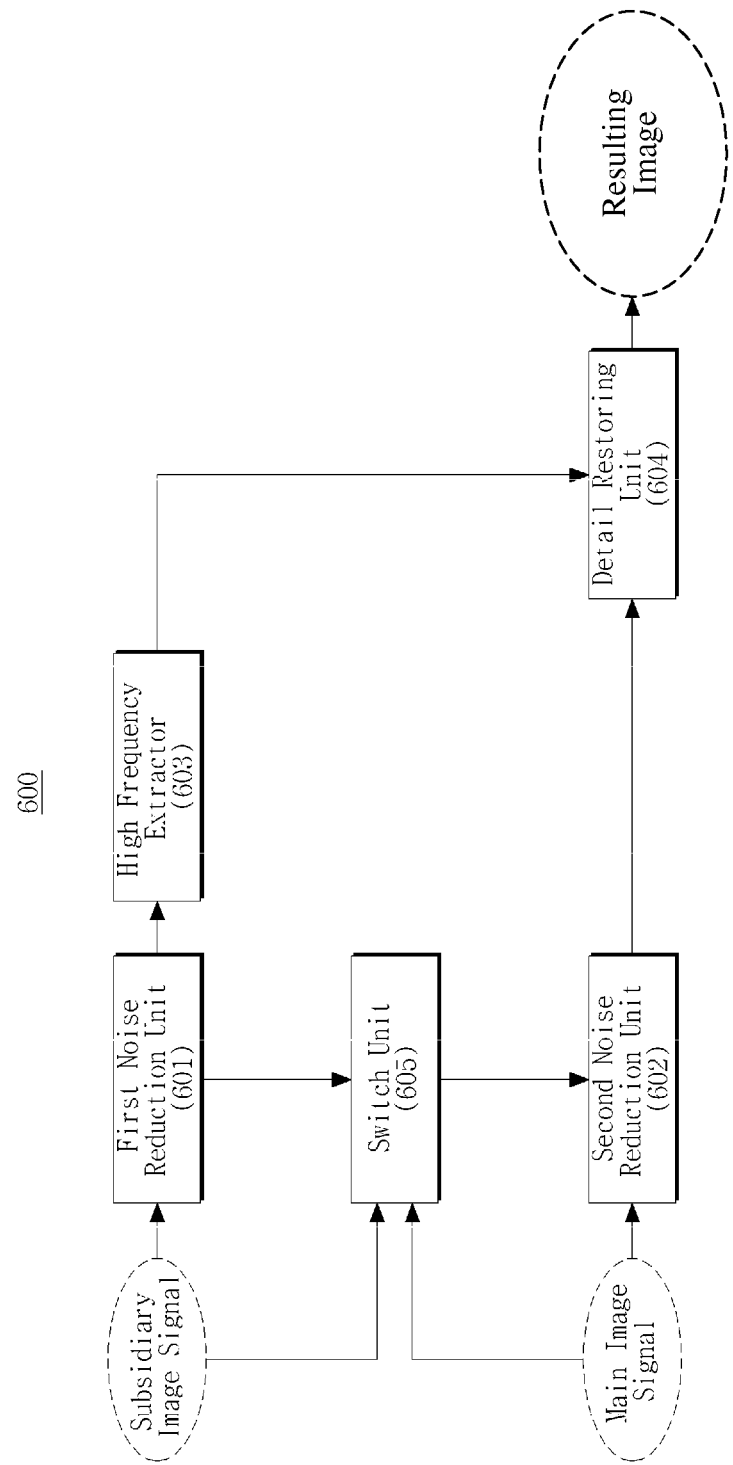
FIG. 6 is a block diagram illustrating yet another exemplary image processing apparatus.

FIG. 6 shows yet another exemplary image processing apparatus 600.

Referring to FIG. 6, the image processing apparatus 600 includes a first noise reduction unit 601, a second noise reduction unit 602, a high-frequency extractor 603, a detail restoring unit 604, and a switch unit 605.

The first noise reduction unit 601 removes or reduces noise of a subsidiary image signal. For example, the subsidiary image signal may be a signal (W) with relatively high sensitivity composed of all bandwidths of visible light, a white and near infrared signal (W+NIR) composed of all wavelengths of visible light and wavelengths of near infrared light, or a white and ultraviolet signal (W+UV) composed of all wavelengths of visible light and wavelengths of ultra-violet light. Various methods can be used to remove or reduce the noise of the subsidiary image signal. For example, a low-pass filter may be used to remove or reduce the noise of the subsidiary image signal.

The first noise reduction unit 601 may include a profile which reflects noise characteristics of the subsidiary image signal.

The second noise reduction unit 602 receives a main image signal, and removes or reduces noise of the main image signal using information about the subsidiary image signal or information about the main image signal.

The second noise reduction unit 602 may remove or reduce the noise of the main image signal using Equations 1, 2 and 3 described above. In this implementation, the second noise reducing unit 602 may estimate a value of $\sigma^2_s$ (see Equation 3), which is variance of the signal, using noise characteristics of the subsidiary image signal received by the first noise reduction unit 601 or using only the main image signal's own information. For example, if the image characteristics of the main image signal and the subsidiary image signal are the same or similar to each other, the value of $\sigma^2_s$ may be estimated using information about the subsidiary image signal, and if the image characteristics of the main image signal and the subsidiary image signal are different from each other, the value of $\sigma^2_s$ may be estimated using only the main image signal's own information.

The switch unit 605 is used to compare the image characteristics of the main image signal with the image characteristics of the subsidiary image signal. The switch unit 605 receives the main image signal and the subsidiary image signal, compares the image characteristics of the main image signal with the image characteristics of the subsidiary image signal, and applies information about the subsidiary image signal output from the first noise reduction unit 601 to the second noise reduction unit 602 or blocks the information about the subsidiary image signal from being applied to the second noise reduction unit 602, according to the result of the comparison.

The high-frequency extractor 603 performs high-pass filtering on the subsidiary image signal from which noise has been removed or reduced, and extracts high-frequency components from the subsidiary image signal.

The detail restoring unit 604 receives the output of the second noise reduction unit 602, and restores details of the main image signal using the high-frequency components of the subsidiary image signal. The detail restoring unit 404 may also have a function of suppressing amplification of noise.

Figure 7:
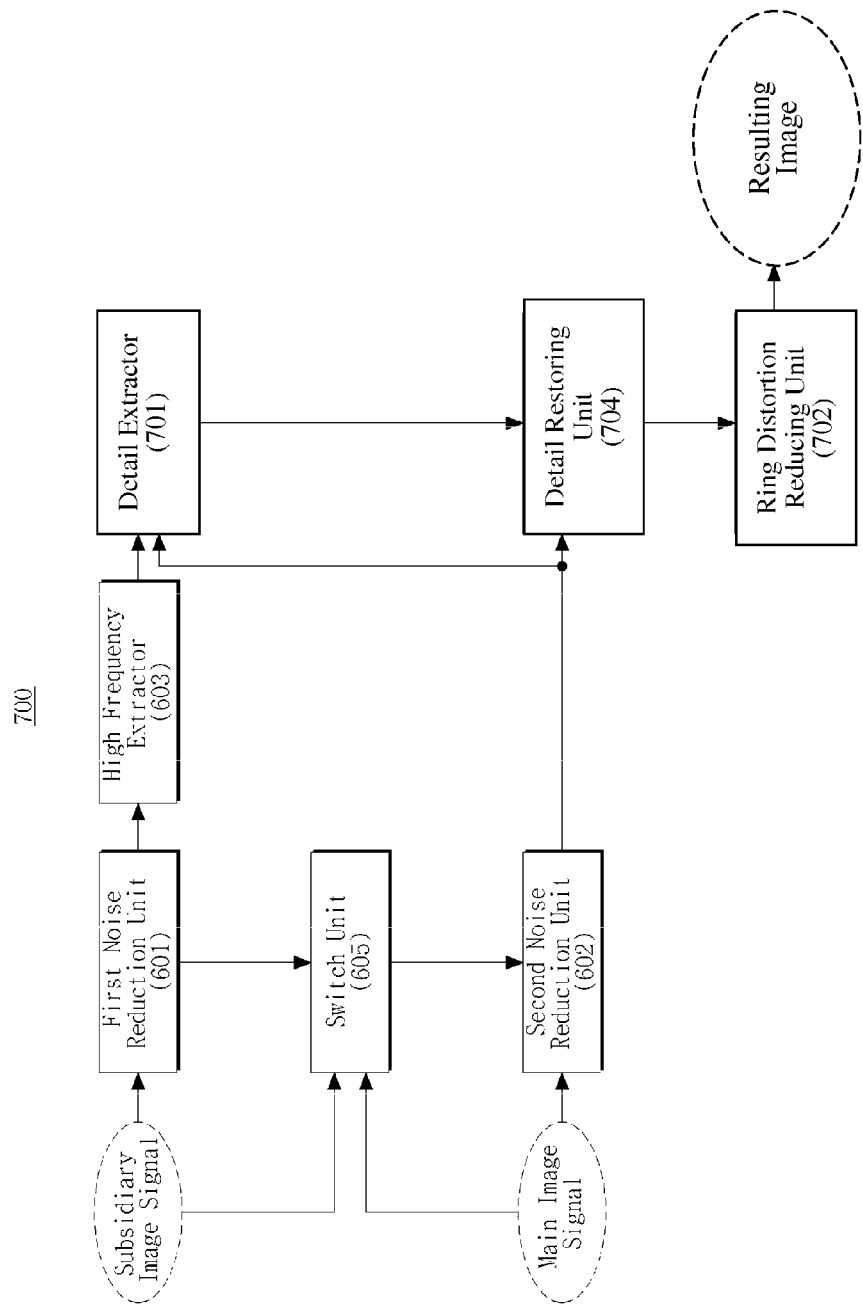
FIG. 7 is a block diagram illustrating still another exemplary image processing apparatus.

FIG. 7 shows still another exemplary image processing apparatus 700.

Referring to FIG. 7, in addition to a first noise reduction unit 601, a second noise reduction unit 602, a high-frequency extractor 603, and a switch unit 605, the image processing apparatus 700 includes a detail extractor 701, a ring distortion reducing unit 702, and a detail restoring unit 704. The first noise reduction unit 601, the second noise reduction unit 602, the high-frequency extractor 603, and the switch unit 605 are substantially the same as the corresponding components described above in FIG. 6, the detail extractor 701, the ring distortion reducing unit 702, and the detail restoring unit 704 are substantially the same as the corresponding components illustrated in FIG. 5, and accordingly, further descriptions thereof will be omitted for conciseness.

Figure 8:
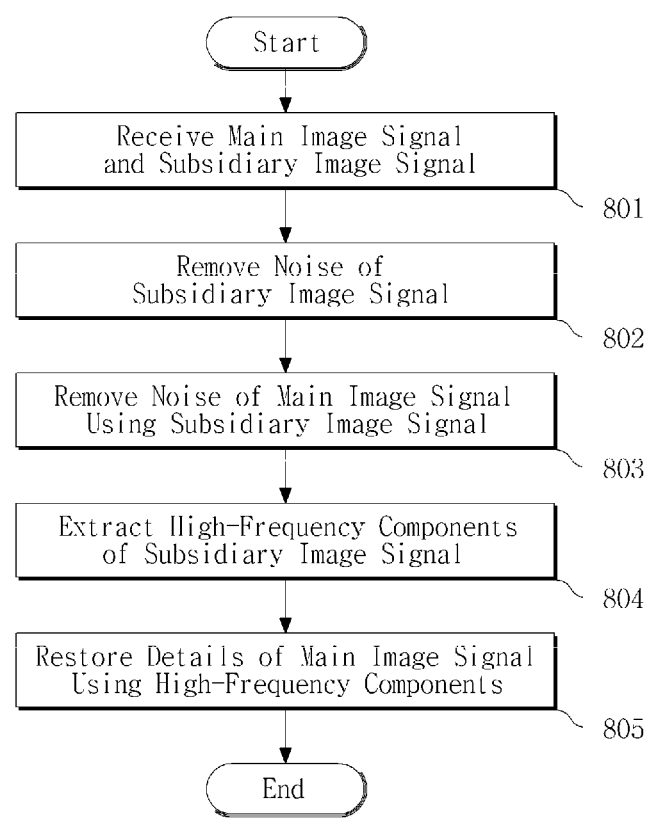
FIG. 8 is a flowchart illustrating an exemplary image processing method.

FIG. 8 shows a flowchart illustrating an exemplary image processing method. The method may be carried out by an image processing apparatus described above.

Referring to FIG. 8, the image processing method includes an operation 801 of receiving a main image signal and a subsidiary image signal. The main image signal may be a color image signal, and the subsidiary image signal may be a signal with relatively high sensitivity composed of all bandwidths of visible light, a signal composed of all wavelengths of visible light and wavelengths of near infrared light, or a signal composed of all wavelengths of visible light and wavelengths of ultra-violet light. The respective signals can be acquired by, for example, the image sensor 300 illustrated in FIG. 3.

In operation 802, noise of the subsidiary image signal is removed or reduced. As described above, various algorithms can be used to remove or reduce the noise of the subsidiary image signal. For example, since the subsidiary image signal has relatively high sensitivity, a low-pass filter may be used to remove or reduce the noise of the subsidiary image signal.

In operation 803, noise of the main image signal is removed or reduced using information about the subsidiary image signal. Equations 1, 2 and 3 described above may be used to remove or reduce the noise of the main image signal. In another example, the noise of the main image signal may be removed or reduced by using information about the subsidiary image signal or using information about the main image signal, according to image characteristics of the main image signal and the subsidiary image signal.

In operation 804, high-frequency components are extracted from the subsidiary image signal from which noise has been removed or reduced. The high-frequency components are used to restore details of the main image signal. In operation 5804, while not indicated in FIG. 8, an operation of distinguishing details from noise to extract only the details may be further performed to avoid amplification of noise.

In operation 805, details of the main image signal are restored using the high-frequency components.

According to certain example(s) described above, an apparatus and a method of processing a color image is provided, where the color image is processed using a subsidiary image with sensitivity that is relatively higher than that of the color image so as to remove or reduce noise of the color image and restore details of the color image.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus comprising one or more modules, one or more devices, or a combination thereof, wherein the image processing apparatus is configured to receive a main image signal and a subsidiary image signal, and remove or reduce noise of the main image signal using information about the subsidiary image signal, and to restore details of the main image signal from which the noise has been removed or reduced using high-frequency components of the subsidiary image signal,
wherein the main image signal is a color signal or an RGB signal, and the subsidiary image signal is a signal composed of all wavelengths of visible light, a signal composed of all wavelengths of visible light and wavelengths of infrared light, or a signal composed of all wavelengths of visible light and wavelengths of ultra-violet light.

2. The image processing apparatus of claim 1, wherein the information about the subsidiary image signal comprises information about a noise characteristic of the subsidiary image signal.

3. The image processing apparatus of claim 1, wherein:
the image processing apparatus comprises a software system, an image processing chip, or both a software system and an image processing chip
the one or modules are one or more software modules of the software system, and
the one or more devices are one or more hardware devices of the image processing chip.

4. An image processing apparatus comprising:
a first noise reduction unit configured to remove or reduce noise of a subsidiary image signal;
a second noise reduction unit configured to remove or reduce noise of a main image signal using information about the subsidiary image signal;
a high-frequency extractor configured to extract high-frequency components of the subsidiary image signal from which the noise has been removed or reduced; and
a detail restoring unit configured to restore details of the main image signal from which the noise has been removed or reduced using the high-frequency components.

5. The image processing apparatus of claim 4, wherein the main image signal is a color signal or an RGB signal, and the subsidiary image signal is a signal composed of all wavelengths of visible light, a signal composed of all wavelengths of visible light and wavelengths of infrared light, and a signal composed of all wavelengths of visible light and wavelengths of ultra-violet light.

6. The image processing apparatus of claim 4, wherein the first noise reduction unit includes a profile which reflects a noise characteristic of the subsidiary image signal.

7. The image processing apparatus of claim 4, wherein the information about the subsidiary image signal comprises information about a noise characteristic of the subsidiary image signal.

8. The image processing apparatus of claim 4, wherein the restoring unit restores the details of the main image signal by composing the main image signal from which the noise has been removed or reduced, with the high-frequency components.

9. The image processing apparatus of claim 4, further comprising a detail extractor configured to receive an output signal of the high-frequency extractor and an output signal of the second noise reduction unit, extract details from the high-frequency components, and apply the details to the detail restoring unit.

10. The image processing apparatus of claim 9, wherein the detail extractor distinguishes the details from noise in the high-frequency components based on brightness.

11. The image processing apparatus of claim 4, further comprising a ring distortion reducing unit configured to remove or reduce ring distortion from an output signal of the detail restoring unit.

12. An image processing apparatus comprising:
a first noise reduction unit configured to remove or reduce noise of a subsidiary image signal;
a second noise reduction unit configured to remove or reduce noise of a main image signal, using information about the subsidiary image signal or information about the main image signal;
a high-frequency extractor configured to extract high-frequency components of the subsidiary image signal from which the noise has been removed or reduced; and
a detail restoring unit configured to restore details of the main image signal from which the noise has been removed or reduced, using the high-frequency components.

13. The image processing apparatus of claim 12, wherein the main image signal is a color signal or an RGB signal, and the subsidiary image signal is a signal composed of all wavelengths of visible light, a signal composed of all wavelengths of visible light and wavelengths of infrared light, or a signal composed of all wavelengths of visible light and wavelengths of ultra-violet light.

14. The image processing apparatus of claim 12, further comprising a switch unit configured to compare an image characteristic of the main image signal with an image characteristic of the subsidiary image signal, and apply the information about the subsidiary image signal to the second noise reduction unit or blocking the information about the subsidiary image signal from being applied to the second noise reduction unit based on the comparison.

15. The image processing apparatus of claim 12, wherein the first noise reduction unit includes a profile which reflects a noise characteristic of the subsidiary image signal.

16. The image processing apparatus of claim 12, wherein the information about the subsidiary image signal comprises information about a noise characteristic of the subsidiary image signal.

17. The image processing apparatus of claim 12, further comprising a detail extractor configured to receive an output signal of the high-frequency extractor and an output signal of the second noise reduction unit, extract details from the high-frequency components, and apply the details to the detail restoring unit.

18. The image processing apparatus of claim 17, wherein the detail extractor distinguishes the details from noise in the high-frequency components based on brightness.

19. The image processing apparatus of claim 12, further comprising a ring distortion reducing unit configured to remove or reduce ring distortion from an output signal of the detail restoring unit.

20. An image processing method for use in an image processing apparatus, the method comprising:
acquiring a main image signal and a subsidiary image signal with sensitivity relatively higher than that of the main image signal;
removing or reducing noise of the subsidiary image signal;
removing or reducing noise of the main image signal, using information about the subsidiary image signal or information about the main image signal;
extracting high-frequency components from the subsidiary image signal from which the noise is removed or reduced; and
restoring details of the main image signal from which the noise has been removed or reduced, using the high-frequency components.

21. The image processing method of claim 20, wherein the main image signal is a color signal or an RGB signal, and the subsidiary image signal is a signal composed of all wavelengths of visible light, a signal composed of all wavelengths of visible light and wavelengths of infrared light, or a signal composed of all wavelengths of visible light and wavelengths of ultra-violet light.

22. The image processing method of claim 20, wherein the removing or reducing the noise of the main image signal comprises removing or reducing the noise of the main image signal, using the information about the subsidiary image signal or the information about the main image signal based on a comparison of an image characteristic of the main image signal with an image characteristic of the subsidiary image signal.

23. The image processing method of claim 20, further comprising extracting details from the high-frequency components by distinguishing the details from noise in the high-frequency components.

24. The image processing method of claim 20, further comprising removing or reducing ring distortion from a signal resulting from the restoring of the details of the main image signal from which the noise has been removed or reduced.

25. The image processing apparatus of claim 1, wherein the image processing apparatus comprises an image processing chip.

26. The image processing apparatus of claim 4, wherein the image processing apparatus comprises an image processing chip.

* * * * *